United States Patent

Sherman

[15] 3,636,432
[45] Jan. 18, 1972

[54] DC-TO-AC TRANSFORMERLESS POWER SUPPLY

[72] Inventor: Marshall L. Sherman, Indianapolis, Ind.
[73] Assignee: William E. Landrum, Indianapolis, Ind.
[22] Filed: Feb. 4, 1970
[21] Appl. No.: 8,554

[52] U.S. Cl. ............................................. 321/16, 321/45 R
[51] Int. Cl. .................................................... H02m 7/52
[58] Field of Search .................. 307/261; 321/16, 18, 60, 61, 321/69, 45; 323/2, 100, 101, 108, 119; 328/60, 61

[56] References Cited

UNITED STATES PATENTS 2,763,830  9/1956  Pihl.....................................323/119 X
3,260,921  7/1966  Brahm................................321/18 X

*Primary Examiner*—A. D. Pellinen
*Attorney*—Woodard, Weikart, Emhardt & Naughton

[57] ABSTRACT

A solid-state power supply with two, positive, 120-volt, 60-Hz. square wave outputs which are 180° out of phase from each other. The power supply contains a crystal-controlled oscillator powered by batteries. The oscillator output frequency is divided to 60 Hz. and split into two signals with a 180° phase shift. The two waves are amplified and fed through constant-current circuits to limit the current draw on the batteries. The constant-current circuits are connected to quasi-complementary circuits by low-impedance coupling circuits.

9 Claims, 4 Drawing Figures

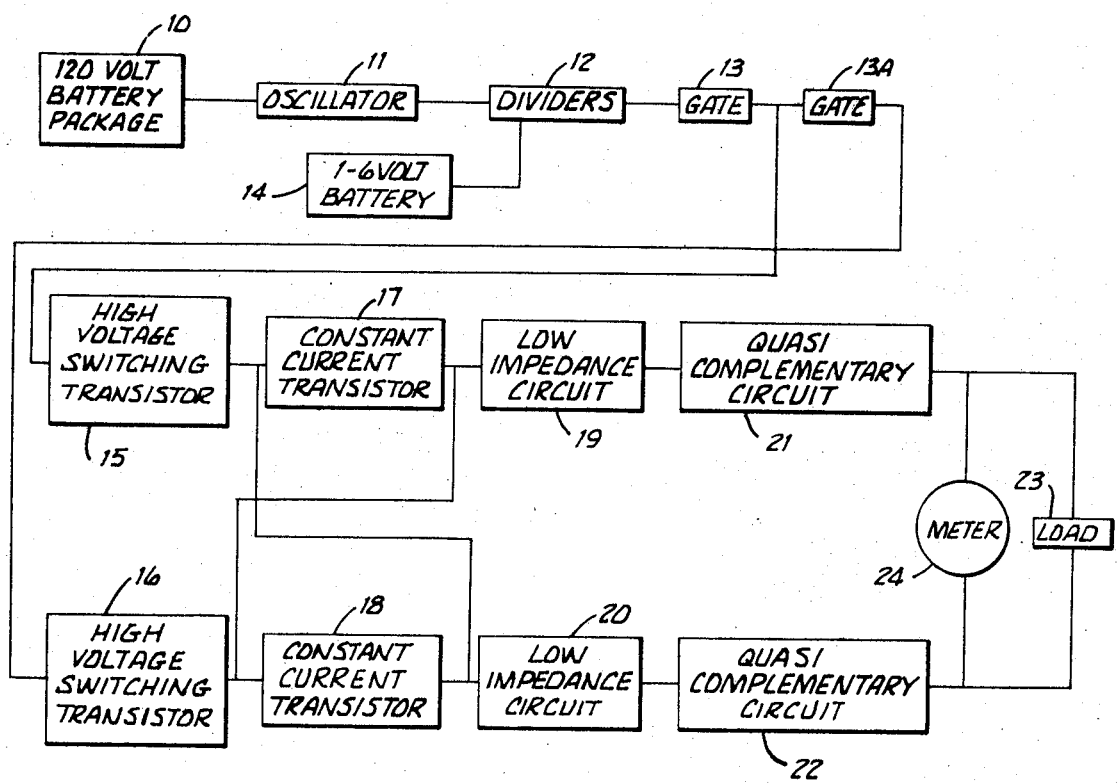
Fig.1.
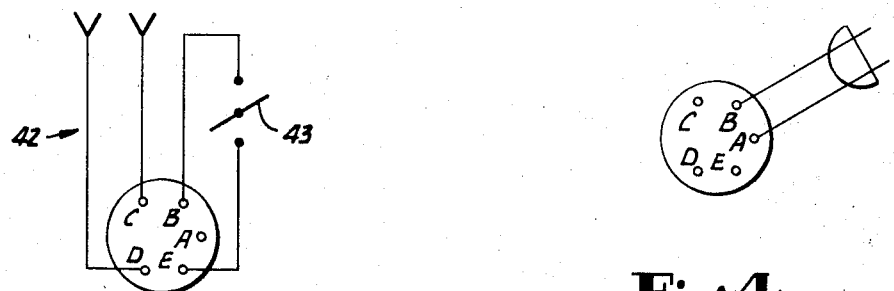
Fig. 3.
Fig. 4.
INVENTOR
MARSHALL L. SHERMAN
BY
Woodard, Weikart, Emhardt & Naughton
ATTORNEYS

DC-TO-AC TRANSFORMERLESS POWER SUPPLY

BACKGROUND OF THE INVENTION

1. Field of the Invention

This invention relates to a power supply with two 120-volt 60 Hz. square wave outputs.

2. Description of the Prior Art

A number of solid-state alternating current power supplies have been developed in recent years. A few of these devices have been powered by batteries in order to provide a portable capability. The designers of the portable AC power supplies have sacrificed power output in order to minimize the weight of the power supply.

The present invention provides a lightweight AC power supply with a large power output. This twofold characteristic has been achieved by utilization of highly efficient processing circuits which transfer the direct current of the batteries into alternating current without the customary losses.

The present power supply is particularly advantageous for providing power for cameras and tape recorders used in the broadcasting industry. The power supplies now on the market have a relative short use time before the batteries need recharging. In addition, these power supplies are not entirely accurate as to frequency and are relatively heavy. The present power supply has a long use time before the batteries require recharging. The present device has a short duration power output of approximately 200 watts While the prior art device is limited to 30 watts. In addition, the present power supply weighs 4 pounds compared to a weight of 15 pounds for the prior art power supply. The output frequency of the present device is very accurate being crystal controlled instead of the free-running oscillator used in the prior device.

SUMMARY OF THE INVENTION

The present invention is a solid-state portable power supply which transforms 120-volt DC from a battery package into two positive 120-volt 60 Hz. square waves which are 180° out of phase from each other. The device contains a crystal-controlled oscillator powered by the battery package. The output frequency of the oscillator is divided to 60 Hz. and split into two square waves with a phase shift. The two waves are amplified and fed through constant-current circuits to limit the current draw on the batteries. The constant-current circuits are connected to quasi-complementary circuits by low-impedance coupling circuits. Two positive square wave signals are provided by the quasi-complementary circuits.

It is one object of this invention to provide a lightweight, portable power supply.

Another object of this invention is to provide a power supply with a large power output and a long useful life.

A further object of this invention is to provide a power supply with an accurate output frequency.

An additional object of this invention is to provide a power supply with two 120-volt 60 Hz. alternating current outputs which are 180° out of phase with each other.

Related objects and advantages will be apparent from the drawings, claims and the portion of the specification which follows.

BRIEF DESCRIPTION OF THE DRAWING

FIG. 1 is a block diagram of the major components and circuits of the power supply.

FIG. 3 is a schematic representation of the output cable for the power supply.

FIG. 4 is a schematic representation of the cable used to recharge the power supply batteries.

DESCRIPTION OF THE PREFERRED EMBODIMENT

Figure 2:
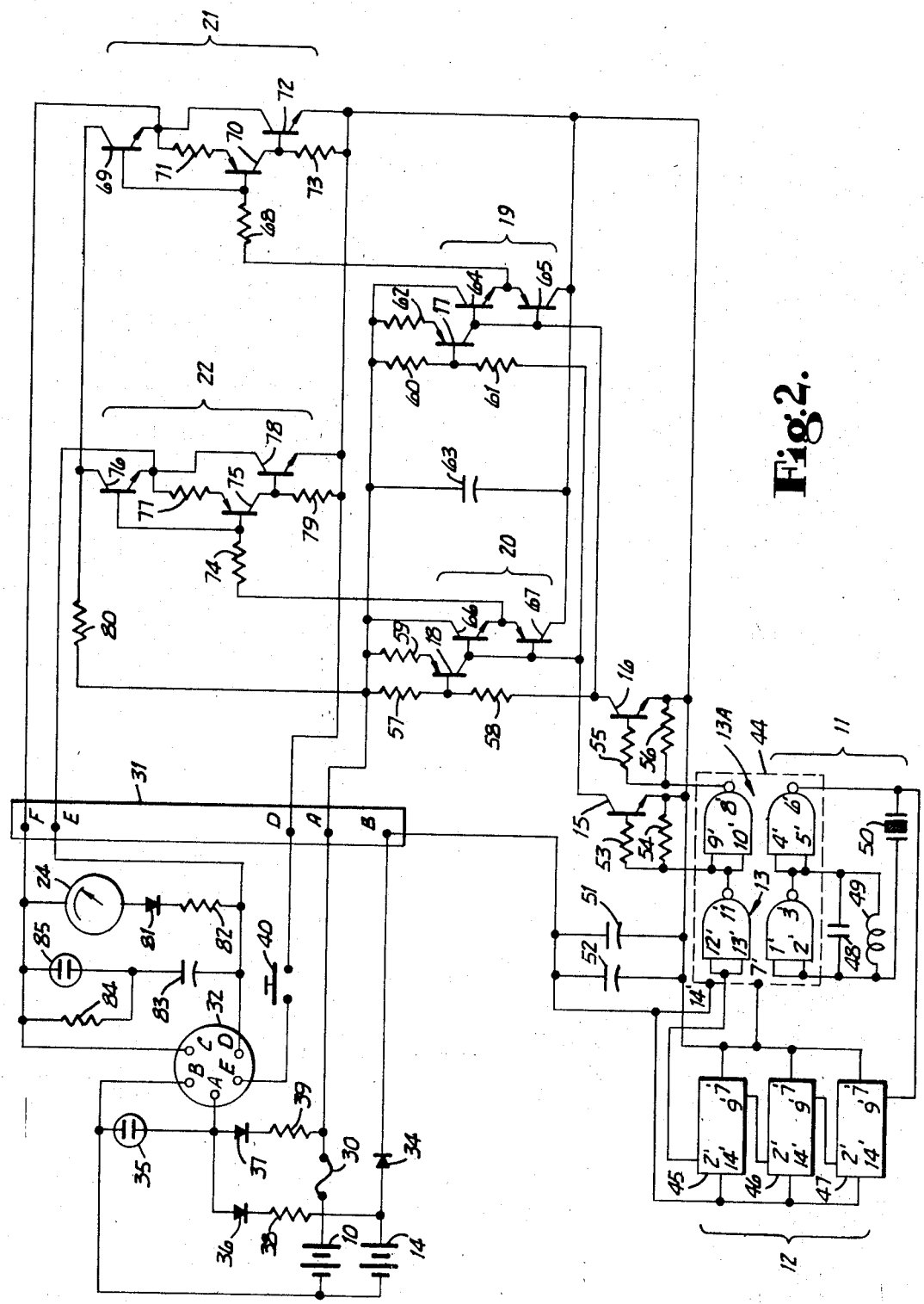
FIG. 2 is a schematic representation of the power supply.

FIG. 1 60 a block diagram of the major elements of the power supply. The power supply transforms 120-volt direct current into 120-volt alternating current. The 120-volt direct current is supplied by a battery package 10 composed of 10 12-volt batteries. The output of the battery package 10 is fed into a 245;760 kHz. square wave oscillator 11 and then to a series of dividers 12 resulting in a 60 Hz. square wave output. This 60Hz. output is fed into gates 13 and 13A resulting in two 60 Hz. square waves which are 180° out of phase with each other. Gate 13 squares up the 60 Hz. signal from dividers 12 and provides a 60 Hz. output signal to drive high-voltage switching transistor 15. Gate 13A also receives the 60Hz. output signal and changes the phase 180° to provide a second 60 Hz. signal at its output to drive high-voltage switching transistor 16. Operating power for the dividers 12 is supplied by a 6-volt battery 14.

The 60 Hz. square waves are amplified by identical high-voltage switching transistors 15 and 16 which in turn saturate constant-current transistors 17 and 18. Both collector outputs of transistors 15 and 18 are directly coupled to a low-impedance circuit 20. Likewise, the outputs of transistors 17 and 16 are coupled to a low-impedance circuit 19. Transistors 15 and 16 amplify the 60 Hz. signals sufficiently so as to provide a sufficiently large control signal to the bases of the transistors in respectively low-impedance circuits 20 and 19. For example, transistor 15 amplifies the signal from gate 13 and then applies the amplified signal to low-impedance circuit 20 which then drives a final current amplifier or quasi-complementary circuit 22. Constant-current transistor 18 limits the current flow through the driver or low-impedance circuit 20 during the driving of circuit 22. Likewise, the 60 Hz. signal from gate 13A is amplified by transistor 16 so as to provide a sufficiently large signal to the bases of the transistors in circuit 19 which drive the final current amplifier in circuit 21. Transistor 17 limits current flow to circuit 19 during the driving of circuit 21. Circuits 19 and 20 are cyclically operated by transistors 16 and 15.

The output of each low-impedance circuit, 19 and 20, is a 60 Hz. square wave with an approximate voltage of 118 volts. The square waves are 180° out of phase.

The two square waves are then processed by quasi-complementary circuits 21 and 22 resulting in two positive 120-volt 60 Hz. square waves. The square waves are 180° out of phase with each other resulting in a combined peak-to-peak signal of 240-volt alternating current across the load 23. Meter 24 indicates the current output of the power supply.

FIG. 2 shows a detailed schematic of the overall power supply circuit. The detailed connections and functions of the components will now be described.

The battery package 10 is composed of 10 12-volt nickel-cadmium rechargeable batteries connected in series. These batteries possess a 1-hour discharge cycle. The positive terminal of battery package 10 is connected to a 1-ampere, 250-volt fuse 30 which is connected at its other end to pin A of printed circuit board connector 31. The negative terminal of battery package 10 is connected to pin B of output connector 32 and to the negative terminal of battery 14. Battery 14 is a 6-volt nickel-cadmium rechargeable battery. The positive terminal of battery 14 is connected to the cathode of diode 34. The anode of diode 34 is connected to pin B of connector 31.

A neon indicator 35 is connected between pins A and B of connector 32. The indicator lights when current flows, through pins A and B of connector 32, for the recharging of batteries 10 and 14. Diode 36 and resistor 38 are connected in series between pin A of connector 32 and the positive terminal of battery 14 in such a manner to allow current flow from connector 32 to battery 14. Diode 37 and resistor 39 are connected in series between pin A of connector 32 and pinA of connector 31 so as to allow current flow from pin A of connector 32 to pin A of connector 31. A power interrupt switch 40 is connected between pin E of connector 32 and pin D of connector 31.

FIG. 3 is a schematic of the output cable 42. The connector of output cable 42 mates with the power supply output connector 32. The power output lines of the output cable 42 are attached to pins C and D of the connector 42. An on-off switch 43 is connected between pins B and E of the connector of output cable 42. By closing the on-off switch 43, 120-volt direct current is applied to the power interrupt switch 40 shown in FIG. 3. By closing the power interrupt switch 40, power is applied out through pin D of connector 31 to the processing networks.

The 120-volt DC output pin D of connector 31 is attached to the input pin 7' of integrated circuits 44, 45, 46 and 47. Integrated circuit 44 is a quad dual-input NAND-gate and integrated circuits 45, 46 and 47 are four-stage binary counters. Pins 14' of the integrated circuits are interconnected. Pin 2' of integrated circuit 45 is connected to pins 12' and 13' of integrated circuit 44. Pin 9' of integrated circuit 45 is connected to pin 2 of integrated circuit 46 and pin 9' of integrated circuit 46 is connected to pin 2' of integrated circuit 47. Pin 9' of integrated circuit 47 is connected to pin 6' of integrated circuit 44. Pins 1' and 2' of integrated circuit 44 are connected to each other and are in turn connected to one end of capacitor 48, ferrite core inductor 49, and frequency crystal 50. The opposite sides of capacitor 48 and inductor 49 are connected to pin 3' of integrated circuit 44. The opposite side of crystal 50 is attached to pin 6' of integrated circuit 44. Inductor 49 and capacitor 48 provide a DC bias while allowing crystal 50 to function. Capacitors 52 and 51 lower the impedance of the battery at the integrated circuit.

The 120-volt DC provided by the battery package 10 is fed to oscillator 11 resulting in a 245,760 kHz. square wave output. The oscillator 11 is composed of frequency crystal 50, ferrite core inductor 49, capacitor 48, and two of the gates in integrated circuit 44. The square wave output results when the in phase signal from the output of one gate is fed the input of the second gate.

The 245.760 kHz. square wave output signal from oscillator 11 is then fed to divider 12 resulting in a 60 Hz. square wave output. Divider 12 is composed of three integrated circuits 45, 46, and 47. Each integrated circuit is a four-stage binary counter which divides its input by 16. Thus, the output of divider 12 is a 60 Hz. square wave signal. The power to operate integrated circuits 44, 45, 46 and 47 is provided by battery 14. Battery 14 provides 6 volts of direct current through pin B by connector 31 to pins 14' of integrated circuits 44, 45, 46 and 47. Connected between the 120-volt DC power input line from pin D of connector 31 and the 6-volt DC power input line from pin B of connector 31 are capacitors 51 and 52.

The 60 Hz. square wave signal from divider 12 is then fed to two gates 13 and 13A located within integrated circuit 44. The first gate provides a steeper rise and fall time for the 60 Hz. square wave while the second gate produces a 180° phase shift. As a result two 60 Hz. square wave signals which are 180° out of phase from each other are provided from gates 13 and 13A of integrated circuit 44 to the high-voltage switching transistors 15 and 16.

The high-voltage switching transistors 15 and 16 amplify the 60 Hz. square wave signals to the extent required to saturate the constant-current transistors 17 and 18. The constant-current transistors are provided in order to limit the current draw from battery package 10. The base of high-voltage switching transistor 15 is connected through current-limiting resistor 53 to pins 9' and 10' of integrated circuit 44. The emitter of transistor 15 is connected through DC return resistor 54 to pins 9' and 10' of integrated circuit 44. In addition, the emitter is connected to the 120-volt DC power input line. Likewise, the base of transistor 16 is connected through a resistor 55 to pin 8' of integrated circuit 44. The emitter of transistor 16 is connected through resistor 56 to pin 8' of integrated circuit 44. In addition, the emitter of transistor 16 is connected to the 120-volt DC power input line. The collectors of transistors 15 and 16 are connected respectively to the constant-current transistors 17 and 18.

The collector of transistor 15 is connected through resistor 61 to the base of constant-current transistor 17. In addition, the base of transistor 17 is connected through resistor 60 to pin A of connector 31. The emitter of transistor 17 is connected through resistor 62 to pin A of connector 31 while the collector of transistor 17 is connected to the bases of transistor 64 and 65 and to the collector of transistor 16. The high-voltage switching transistor 16 is connected in a similar manner as the high-voltage switching transistor 15. That is, the collector of transistor 16 is connected through resistor 58 to the base of constant-current transistor 18 which in turn is connected through resistor 57 to pin A of connector 31. The emitter of transistor 18 is connected through resistor 59 to pin A of connector 31. The collector of transistor 18 is connected to the bases of transistors 66 and 67 and to the collector of transistor 15. The collectors of transistors 67 and 65 are connected to the 120-volt DC power input line while the collectors of transistors 66 and 64 are connected to pin A of connector 31. The emitters of transistors 66 and 67 are interconnected and the emitter of transistors 64 and 65 are interconnected. Connected between the collectors of transistors 67 and 65 and pin A of connector 31 is capacitor 63. When transistor 15 receives the positive-going square wave from gate 13, the transistor 15 saturates and thereby shorts the base of transistor 67 and resistor 61. Resistors 60 and 61 are voltage dividers and with resistor 61 shorted to transistor 15, the base voltage of transistor 17 is fixed. Therefore, the emitter voltage of transistor 17 is fixed causing a constant current through resistor 62 and through the collector of transistor 17. The constant current from the collector of transistor 17 supplies base current for transistor 64 which turns on causing its emitter to apply a positive signal to resistor 68. Transistor 65 is back biased in the off position when transistor 64 turns on. Simultaneously, transistor 15 shorts the bases of transistors 66 and 67 turning off transistor 66 and turning on transistor 67. When transistor 15 is deactivated, transistor 16 is activated thereby activating transistors 18, 66 and 65 and deactivating transistors 67, 17 and 64 in a manner identical to that described for transistor 15. It can be appreciated that a positive square wave signal is applied to first resistor 74 and then to resistor 68 in a cyclical manner. Capacitor 63 lowers the impedance of the battery to circuits 19 and 20.

The low-impedance circuits 19 and 20 provide a low-impedance coupling between the constant-current transistors and the quasi-complementary circuits. The quasi-complementary circuits 21 and 22 are identical and are composed of two NPN-power-transistors and one PNP-high-voltage-transistor. The output of low-impedance circuit 19 is connected through resistor 68 to the bases of transistors 69 and 70. The emitter of transistor 69 is connected through resistor 71 to the emitter of transistor 70. The collector of transistor 70 is connected to the base of transistor 72 and through resistor 73 to the 120-volt DC power input line. The emitter of transistor 72 is also connected to the 120-volt DC power input line while the collector of transistor 72 is connected to the emitter of transistor 69 and in addition is connected to pin F of connector 31. The signal output of quasi-complementary circuit 21 is provided to pin F of connector 31 and is a positive 60 Hz. square wave with an amplitude of 120 volts.

The quasi-complementary circuit 22 is connected to the output of low-impedance circuit 20. The output of the low-impedance circuit 20 is connected through resistor 74 to the base of transistor 75 and transistor 76. The emitter of transistor 76 is connected through resistor 77 to the emitter of transistor 75. The collector of transistor 75 is connected to the base of transistor 78 and through resistor 79 to the 120-volt DC power input line. The emitter of transistor 78 is connected also to the power input line. The collector of transistor 78 and the emitter of transistor 76 are connected to pin E of connector 31. The collector of transistor 76 and the collector of transistor 69 are connected through resistor 80 to pin A of connector 31. The power output of the quasi-complementary circuit 22 is a positive 60 Hz. square wave with an amplitude of 120 volts. The output is applied to pin E of connector 31. When the positive driving signal from driver circuit 19 is applied to current-limiting resistor 68, then transistor 69 turns on and transistor 70 is switched off with transistor 69 amplifying the current providing a 120-volt signal at pin F. When transistor 64 deactivates and transistor 65 activates, then transistor 69 deactivates and transistor 70 turns on with the current flowing through resistor 73 thereby turning on transistor 72 and causing zero voltage to occur on pin F. Of course, when zero voltage occurs on pin F, a voltage of 120 volts is present on pin E since transistor 76 has been activated by transistor 66 of driver circuit 20 in a manner identical to that described for circuit 19. Resistor 80 provides a voltage drop so that transistors 76 and 69 can be driven to saturation. Resistors 71 and 77 respectively determine the current supplied by transistor 75 to the base of transistor 78 and the current supplied by transistor 70 to the base of transistor 72.

The power outputs of quasi-complementary circuits 21 and 22 are connected across meter 24 and out through pins C and D of connector 32. Meter 24 indicates the current flow out of the quasi-complementary circuits 21 and 22. The output of quasi-complementary circuit 21 is connected through pin F of connector 31 to the first side of meter 24, the first side of neon indicator 85, and to pin C of connector 32. The output line from quasi-complementary circuit 22 is connected through pin E of connector 31 to the second side of meter 24 and to pin D of connector 32. Connected between meter 24 and the output line from the quasi-complementary circuit 22 is diode 81 in series with resistor 82 so as to prevent flow from the quasi-complementary circuit 22 into the meter 24. Connected between the second side of neon indicator 85 and pin D of connector 32 is capacitor 83. Resistor 84 is connected in parallel with neon indicator 85. Neon indicator 85 will light when current flows out of the quasi-complementary circuits. The two 60 Hz. square waves provided out through pins C and D of connector 32 have a combined peak-to-peak voltage across the load of 240 volts.

Shown in FIG. 4 is the schematic for the cable used to charge batteries 10 and 14. The connector of the cable must mate with the power output connector 32. The batteries are recharged by applying power to pins A and B.

Examples of components which have been successfully employed in the circuit of FIG. 2 are as follows:

| | |
|---|---|
| Integrated Circuit 44 | 9002 |
| Integrated Circuits 45, 46, & 47 | 9989 |
| Frequency Crystal 50 | 245.760 |
| Transistors 15 & 16 | 2N 5551 |
| Transistors 17, 18, 65, 66, 70 & 75 | 2N 4889 |
| Transistors 64 & 66 | 2N 3440 |
| Transistors 69, 72, 76 & 78 | RCA 40322 |
| Inductor 49 | HY 10,000 |
| Capacitor 48 | pF 68 |
| Capacitor 52 | F 0.01 |
| Capacitor 51 | F 100 |
| Capacitor 83 | F 0.04 |
| Capacitor 63 | F 1 |
| Resistors 53, 54, 55 & 56 | ohms 1000 |
| Resistors 57 & 60 | ohms 1500 |
| Resistors 58 & 61 | ohms 100,000 |
| Resistors 59 & 62 | ohms 82 |
| Resistors 68, 71, 74 & 77 | ohms 10 |
| Resistors 73 & 79 | ohms 39 |
| Resistor 80 | ohms 3.3 |
| Resistor 38 | ohms 1000 |
| Resistor 39 | ohms 110 |
| Resistors 82 & 84 | ohms 62,000 |
| Diodes 34, 36, 37 & 81 | IN 5090 |
| Batteries 10 & 14 | Union Carbide Corp. 12 volt & 6 volt with a one hour discharge cycle. |

It will be evident from the above description that the present invention provides a power supply with highly efficient circuits to transform the battery direct current into alternating current. It will also be evident from the above description that the power supply is lightweight and possesses a large power output.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A transformerless power supply comprising:
   a source of direct current electrical energy;
   an oscillator connected to said source;
   a dividing circuit arranged to divide the signal output from said oscillator to a fixed-frequency signal;
   a phase-shifting circuit connected to said dividing circuit, said phase-shifting circuit having first and second fixed-frequency outputs, one of said outputs being out of phase with the other said output;
   a first and second high-voltage switching transistor, said first transistor being connected to said first output of said phase-shifting circuit, said second transistor being connected to said second output of said phase-shifting circuit;
   a first and second constant-current circuit, said first constant-current circuit being connected to said first transistor, said second constant-current circuit being connected to said second transistor;
   first and second current drivers for providing a low-impedance coupling from said constant-current circuits to the current amplifiers, said first current driver being connected to said first constant-current circuit, said second current driver being connected to said second constant-current circuit;
   first and second current amplifiers, said first amplifier connected to said first driver and having a positive output, said second amplifier connected to said second driver and having a positive output, said positive outputs being out of phase with each other.

2. The power supply of claim 1 wherein said oscillator includes a first and second gate connected in series, a frequency crystal in parallel with said gates, an inductor in parallel with said first gate, and a capacitor in parallel with said inductor.

3. The power supply of claim 1 wherein said dividing circuit includes three binary counters connected in series, each of said counters dividing its input frequency by 16.

4. The power supply of claim 1 wherein said phase-shifting circuit includes two gates connected in series.

5. The power supply of claim 1 wherein:
   said first constant-current circuit includes a third transistor, said third transistor having an emitter connected through a resistor to said source of energy, said third transistor having a base connected through a first resistor to said second transistor and through a second resistor to said source, said third transistor having a collector connected to said first transistor and to said first driver;
   said second constant-current circuit includes a fourth transistor, said fourth transistor having an emitter connected through a resistor to said source, said fourth transistor having a base connected through a first resistor to said first transistor and through a second resistor to said source, said fourth transistor having a collector connected to said second transistor and to said second driver.

6. The power supply of claim 1 wherein:
   said first driver includes a third and fourth transistor, said third and fourth transistor having control means connected to said first constant-current circuit, said third and fourth transistor having load paths connected together and to said first amplifier;
   said second driver includes a fifth and sixth transistor, said fifth and sixth transistor having control means connected to said second constant-current circuit, said fifth and sixth transistor having load paths connected together and to said second amplifier.

7. The power supply of claim 1 wherein:
   said first amplifier includes a third, fourth and fifth transistor, said third and fourth transistor having control means connected through a resistor to said first driver, said third and fourth transistor having load paths connected together through a resistor, said fifth transistor having control means connected to said load path of said third transistor and also having a load path connected to said load path of said fourth transistor;

said second amplifier includes a sixth, seventh and eighth transistor, said sixth and seventh transistor having control means connected through a resistor to said second driver, said sixth and seventh transistor having load paths connected together through a resistor, said eighth transistor having control means connected to said load path of said sixth transistor and also having a load path connected to said load path of said seventh transistor.

8. The power supply of claim 5 wherein:
said fixed-frequency signal is a 60 Hz. signal and said fixed-frequency outputs are each 60 Hz.

9. The power supply of claim 7 wherein:
said fixed-frequency signal is a 60 Hz. signal and said fixed-frequency outputs are each 60 Hz.

* * * * *